Oct. 11, 1966 J. R. RAGEN 3,278,757

DIODE BRIDGE GATE UTILIZING DIODE AMPLIFICATION TO GATE SIGNALS BELOW DIODE THRESHOLD

Filed Sept. 18, 1963

INVENTOR.
JACK R. RAGEN
BY Alden D. Redfield
Irwin P. Garfinkle
ATTORNEYS 3,278,757

DIODE BRIDGE GATE UTILIZING DIODE AMPLIFICATION TO GATE SIGNALS BELOW DIODE THRESHOLD

Jack R. Ragen, Cincinnati, Ohio, assignor to Avco Corporation, Cincinnati, Ohio, a corporation of Delaware Filed Sept. 18, 1963, Ser. No. 309,708
1 Claim. (Cl. 307—88.5)

This invention relates to a high speed electronic commutator, and more particularly to a command momentary circuit connector.

The invention uses the inherent characteristics of solid-state semiconductors to produce a bilateral switch capable of switching from an impedance in the order of megohms to a high order conductance in a very short period. The invention is useful, for example, in switching systems where a number of inputs are sequentially sampled to supply time-shared data.

The invention found utility in a system of the type disclosed in the copending United States patent application of Jack R. Ragen and Philip M. Crosno, entitled "Tracking Symbol Follower," filed November 26 1962, Serial No. 240,070, and assigned to the same assignee as this invention, now U.S. Patent No. 3,158,858 issued November 24, 1964. In that application an error slope voltage was applied to an error detector. In addition, the radar returns from a particular target, derived from a position-tracking gate, were applied through an error sampler to the error detector. The error slope voltage started at a controlled time and ran from a given negative voltage to a given positive voltage, and was then gated by particular target returns through the detector to an integrator. If the system was properly tracking a target, then the target returns applied to the error detector were centered with respect to the error slope voltage so that as much of the error slope occurring below zero volts as occurred above zero volts was gated through to the integrator. If there was an error, it resulted in an unbalance of positive and negative gated voltages producing a polarized error output from the integrator. The polarized error output was then fed back to correct the time of start of the error slope voltage. This invention is directed primarily to the electronic commutator associated with the error detector.

An object of this invention is to provide an electronic commutator suitable for use with very low voltage signals in the order of millivolts, as well as signals in the order of volts.

Another object of this invention is to provide an electronic commutator comprising a plurality of diodes in conjunction with a controlled transistor for rendering the diodes conductive or non-conductive upon command.

For other objects and for a better understanding of the details of this invention, reference should now be made to the accompanying drawings in which:

FIGURE 1, partly in block diagram form, represents a preferred embodiment of this invention;

Figures 1, 2, 3, 4:
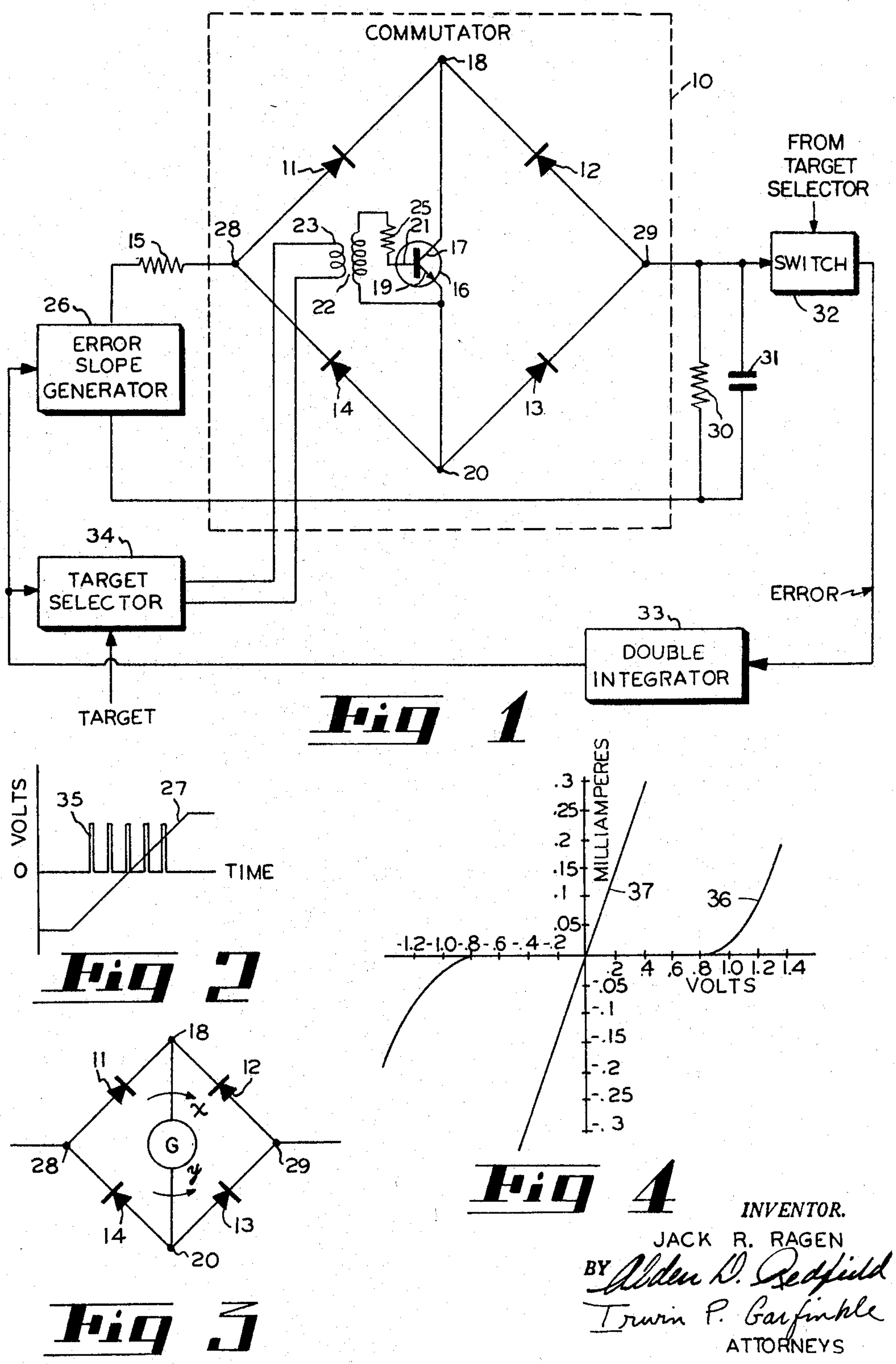
FIGURE 2 illustrates a typical voltage output from the error slope generator with superimposed gating pulses.
FIGURE 3 is illustrative of the operation of the invention.
FIGURE 4 illustrates the improved operating characteristics of a commutator incorporating the features of this invention as compared with a commutator not utilizing a transistor drive.

In FIGURE 1 my novel commutator 10 is incorporated in a symbol tracker follower servo loop of the type disclosed in said copending application. The commutator 10 comprises four semiconductor silicon diodes 11, 12, 13, and 14 arranged in a conventional back-to-back configuration. The collector 17 and emitter 19 of a silicon transistor 16 are connected across one diagonal of the diode circuit, the collector 17 being connected to the terminal 18 and the emitter 19 being connected to the terminal 20. Gate input signals are applied to the base 21 by means of a transformer 22 having a primary winding 23 and a secondary winding 24 connected across the base-emitter junction through a resistor 25.

In this case the voltage to be detected by the commutator 10 is developed in an error slope generator 26. This voltage supplies the collector bias for the transistor 16. The curve 27 in FIGURE 2, representing the voltage output from the error slope generator, is a wave of given slope and of predetermined minimum and maximum voltages, but its time of initiation is controllable. The error slope voltage output from the generator 26 is applied through a resistor 15 to the junction 28 of the commutator 10, and if the commutator is in a conducting state, voltages are derived from the terminal 29 and applied across a parallel-connected resistor 30 and capacitor 31 for temporary storage. The voltages developed in the capacitor 31 are then discharged by means of a controlled switch 32 through an integrating network 33, which in the copending application was a double integrator, and returned to the input of error slope generator 26 as positional data to control the time base position of the error slope voltage for a succeding sampling. The output of integrator 33 is also applied to a target selector 34 which serves to indicate a particular target, selecting the return pulses from only that target for application to the transistor 16 through the transformer 22. The target selector also provides the signal to the switch 32 for controlling its time of operation. Target detection and selection are conventional in the art, and no further discussion of the target selector will be included in this application, although certain of the tracking techniques actually used are described in the aforementioned application.

FIGURE 2 also illustrates a series of pulses 35 superimposed on the error slope voltage curve 27. The pulses 35 represent exemplary target returns from a single target and are used to gate the transistor 16 on and off. If the transistor 16 is not conducting, no current path exists for any portion of the error slope voltage through the commutator 10. However, if the transistor 16 is rendered conductive, current flows from the error slope generator 26 through the diode 11, the collector and emitter of transistor 16, and the diode 13 for voltages of one polarity, or through the diode 12, the collector and emitter of transistor 16 and the diode 14 for voltages of opposite polarity. In either case, four diode junctions are connected in series, and each of diodes 11–14 requires a range of approximately .4 to .6 volt before it is rendered conductive. This means that a considerable portion of the error slope voltage might be dissipated before the diodes begin to function. Therefore, simply rendering the transistor 16 conductive is equivalent to using transistor 16 as a single-pole switch, and no current will flow through the commutator 10 until the error slope voltage exceeds about .8 volt, the summation of the voltage required to render two of the diodes conductive through the transistor emitter-collector circuit. As used in this embodiment, however, voltages from the error slope generator 26 in the order of millivolts are sufficient to produce current flow through the commutator 10 to the integrating load circuit 30, 31. The reason for this is that the transistor 16, upon termination of each output pulse from the target selector 34 becomes, in effect, a negative resistance, or a voltage-generating source such as indicated in FIGURE 3, where the transistor is depicted as a generator G with an output comprising a decaying alternating voltage having an initial high frequency and decreasing in frequency as the magnitude decays toward zero. This condition is possible only when a relatively small voltage bias exists on the collector of the transistor, and this is the case since the only bias on the collector 17 is the output from generator 26.

The action of the system is as follows: Upon removal of each pulse 35, with only a low voltage on the collector 17, the transistor cuts off and, behaving as an L-C circuit, becomes an oscillator, resulting in a repeated sharp rise and fall of decaying currents at the diodes 11–14 and in the collector-emitter junction of transistor 16. This action produces a modulated or pumping function which renders the diodes temporarily a small negative resistance in the network; that is, the diodes are swung through the normal zero conduction point into a small current negative region where they function as generators for a short time. During this period the impedances of the diodes are reduced to essentially zero or even negative values. As indicated by the arrows $x$ and $y$ in FIGURE 3, the current paths existing under these conditions will be through parallel paths comprising the diodes 11 and 12 and the diodes 14 and 13. The current generated by the transistor 16 is then shorted by the two paths so that the transistor oscillations never appear in the output of the commutator, provided the diodes are reasonably matched for impedance characteristics. The decrease in impedance may represent a gain in the order of 35 to 60 db over conventional circuitry. For example, the increased sensitivity would allow a 20 millivolt signal to be gated through while under the same conditions without oscillation in the diode junctions, a drive of .8 volt would be required to gate through two of the diodes in series. The improvement is illustrated in FIGURE 4 where the curve 36 represents the results achieved without the benefits of this invention, and the curve 37 represents the performance resulting from the use of this invention. Optimization of the circuit parameters might produce a gain in the order of 60 db.

It will be noted that the curve 37 has a constant slope, and therefore the average impedance of the diodes appears as a relatively fixed resistance. On the other hand, the curve 36 is exponential and the impedance varies in the same manner as the ordinary diode. With the oscillations induced in the diode junctions, the impedance of the diodes will remain constant until a critical voltage (about .8 volt for the particular diodes) is applied to the transistor collector. At this point the oscillations within the collector-emitter junction of the transistor will be quenched and the two curves 36 and 37 will merge. It is likely that the merger occurs as a sharp break in the curve 37 at about the critical value for the collector bias of transistor 16.

Thus, the present invention provides means for using the inherent characteristics of the diode and transistor in combination with a pulse modulation or "pumping" action to achieve improvement in conductivity.

The action is not understood completely, and the following explanation is offered based on theory and empirical observation: A number of minority carriers are set into motion by pulsing the base-emitter junction diode into a semi-saturated region. Upon removal of the pulsed voltage, the recombining or equalization of these carriers causes the transistor to function as a high frequency generator as indicated in FIGURE 3, provided the voltage on the collector is below the critical bias bevel. The generated oscillations following each pulsing of the transistor 16 decay at an exponential rate, and at a decreasing frequency which may initially be in the megacycle range and end at zero frequency. The more voltage applied to the collector, the faster the decay. At or about the critical voltage, for example, .8 volt, oscillations are locked out. The period of pumping (i.e., oscillations) is also controlled by parameters in the base-emitter circuit, the pulse power driving the base-emitter junction and the semiconductor composition; i.e., the percentage of doping in the junction areas. The self-generating action of the transistor is augmented by similar actions in the diodes 11–14 in series with the current flow from the error slope generator 26 gated by the transistor. The small voltage so generated in all the junctions is sufficient to produce high forward conduction through all the silicon diodes 11–14 and through the transistor.

L. P. Hunter in Handbook of Semiconductor Electronics, Brauer, Mast, and Burns in U.S. patent application Serial No. 257,022, filed February 7, 1963, now abandoned assigned to the same assignee as this invention, and Midkiff in U.S. application Serial No. 34,765, filed June 8, 1960, now Patent No. 3,139,533 and also assigned to the same assignee as this invention, show that diodes may be "pumped" to provide amplification. The backward diode characteristic, i.e., the area of effectively negative resistance, is used in the present invention to provide near zero and even negative resistance at extremely low drive levels. Closed circuit conditions, essentially short circuits in nature, have been achieved for periods ranging in the low order of microseconds by introducing a one microsecond base drive pulse varied only in amplitude. Operation of the switch may be repeated at high repetition rates and 100 kc. sampling was practical. The order of sensitivity achieved is realized only in the region below that point where the residual impedance of the diodes is exceeded to allow the collector to be biased. At that point the pumping action is retarded and gradually eliminated. Once the collector is biased above the critical value, the transistor becomes an ordinary valve.

While this invention is not limited to any particular circuit parameters, in a system actually reduced to practice, diodes 11–14 were Type 1N302B, and for the transistor 16, Types HA9048 and 2N2270 were each satisfactory.

Many modifications and adaptations will at once become apparent to persons skilled in the art. It is the intention, therefore, that this invention be limited only by the appended claim.

I claim:

The combination comprising:

a source of direct voltage error signals, said source being connected between a first terminal and a point of reference potential;

a load connected between a second terminal and said point;

semiconductor switch means for connecting said first terminal to said second terminal through first and second paths, said switch means comprising first, second, third, and fourth semi-conductor diodes and a transistor having base, emitter, and collector electrodes, said first path consisting of said first diode, the collector-emitter junction of said transistor, the base-emitter junction of said transistor and said third diode connected in series between said terminals in the order named, said first and third diodes being poled for conduction of currents of one polarity, said second path consisting of said second diode, the emitter-base junction, the base-collector junction, and said fourth diode connected in series between said terminals in the order named, said second and fourth diodes being poled for conduction of currents of opposite polarity, the sole operating bias for said transistor junctions being provided by said source of direct voltage error signals, said source having normal operating error signal levels below the threshold level required for overcoming the initial impedance of said diodes and said junctions; and means for producing oscillations in said base-emitter and base-collector junctions of said transistor, said means comprising a sharply terminating pulse having a magnitude sufficient to saturate the base-emitter junction of said transistor, whereby at the termination of said pulse the impedance of said semiconductor diodes and of said junctions is reduced to permit current flow from said source at said normal operating error signal levels.

References Cited by the Examiner

UNITED STATES PATENTS 3,148,323 9/1964 Blake et al. ---------- 307—88.5

FOREIGN PATENTS 891,604 3/1962 Great Britain.

ARTHUR GAUSS, *Primary Examiner.*

R. H. EPSTEIN, *Assistant Examiner.*